US007024978B1

(12) United States Patent
Helinski

(10) Patent No.: US 7,024,978 B1
(45) Date of Patent: Apr. 11, 2006

(54) CONCENTRIC ALIGNMENT DEVICE FOR DIES AND DIE STRIPPER

(75) Inventor: Edward F. Helinski, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 633 days.

(21) Appl. No.: 09/113,712

(22) Filed: Jul. 10, 1998

(51) Int. Cl.
*B26F 1/14* (2006.01)
*B23Q 3/00* (2006.01)

(52) U.S. Cl. ............................ 83/684; 83/685; 29/465

(58) Field of Classification Search .......... 83/684–691, 83/136–141; 29/465
See application file for complete search history.

(56) References Cited

U.S. PATENT DOCUMENTS 2,217,560 A * 10/1940 Michon ........................ 83/684
3,080,839 A * 3/1963 Fein et al. ................ 83/689 X
3,465,634 A * 9/1969 Blais ........................ 83/686 X
3,496,818 A * 2/1970 Porter et al. .............. 83/685 X
3,608,413 A * 9/1971 Borello ...................... 83/685 X
4,151,768 A 5/1979 Shockovsky .................... 83/33
4,267,753 A * 5/1981 Bennett ..................... 83/690 X
4,425,829 A 1/1984 Kranik et al. ................ 83/62.1
4,843,931 A * 7/1989 Whister ........................ 83/138
4,893,536 A 1/1990 Kinoshita ..................... 83/451
4,949,614 A 8/1990 Hoppestad ................... 83/681
4,977,804 A * 12/1990 Naito .......................... 83/684
4,989,482 A 2/1991 Mason .......................... 83/22
4,993,294 A 2/1991 Chun et al. .................. 83/139
5,042,352 A * 8/1991 Lux ............................ 83/690
5,056,392 A * 10/1991 Johnson et al. ............... 83/684
5,214,991 A 6/1993 Shimizu et al. ............... 83/168
5,445,057 A * 8/1995 Fujita .......................... 83/686
5,661,656 A 8/1997 Goldman ................. 72/21.1 X
6,598,505 B1 * 7/2003 Henderson et al. ........... 83/687

* cited by examiner

*Primary Examiner*—Allan N. Shoap
*Assistant Examiner*—Jason Prone
(74) *Attorney, Agent, or Firm*—Connolly, Bove, Lodge & Hutz, LLP; William H. Steinberg

(57) ABSTRACT

A punch and die alignment system. A first die includes a first die aperture for receiving a punch. A second die includes a second die aperture for receiving the punch. A first housing includes a first die-receiving passage for receiving at least a portion of the first die. A second housing includes a second die-receiving passage for receiving at least a portion of at least one of the second die and the first die and for permitting at least one of the first die and the second die to rotate therein, thereby permitting the first die aperture and the second die aperture to be aligned with each other.

17 Claims, 2 Drawing Sheets

CONCENTRIC ALIGNMENT DEVICE FOR DIES AND DIE STRIPPER

FIELD OF THE INVENTION

The present invention relates to devices for forming holes in substrates. In particular, the present invention relates to a device for mechanically punching holes in substrates. The present invention is particularly useful for punching holes in thin films for use in the electronics industry. More particularly, the present invention relates to a device for aligning punches in dies for mechanically forming holes in substrates.

BACKGROUND OF THE INVENTION

Some aspects of the fabrication of structures for use in the electronics industry require the formation of holes in a substrate. Often, the holes punched in the substrate are quiet small. Additionally, typically the holes must be very accurately located. These factors also subject the apparatus utilized to form the holes to similar tolerance and alignment standards.

As previously discussed the invention involves optimizing the alignment of the first die aperture and the second die aperture with respect to each other and also with respect to the punch so that there is minimal friction from the walls of the apertures as the punch passes through the apertures. A perfect alignment is not required. In that regard, as previously noted, punches and dies have clearances and tolerances. As such, any clearance would mean that a perfect alignment is not absolutely necessary for the assembly to operate since there could be open space at least partially around the punch. Thus, as previously pointed out, an intent of the invention is to have the die apertures as optimally close as concentrically permitted which again does not require perfect alignment. In practicing the invention, as previously described, attempts are made to align the first and second apertures with respect to each other while attempting to advance the punch through the apertures. This means that the optimal alignment that is attempted to be achieved is one with regard, not only, to the first and second die apertures but also with regard to the punch. The optimal alignment is achieved by rotating a die while the punch is attempted to be depressed repeatedly until the most concentric alignment between the punch receiving aperture 40 and the punch receiving aperture 50 is achieved. In describing actual practices of the invention, it has been previously pointed out that a plurality of die and punch sets for an assembly have been matched for rotation alignment. In utilizing the invention the components of the potential sets were selected which did not fit well regardless of rotation of alignment. Accordingly, these components could be eliminated from the final assemblies. The remainder of the components by use of the invention could then be optimally matched to provide a better fitting die bar assembly which results in higher punch and die life.

SUMMARY OF THE PRESENT INVENTION

Aspects of the present invention provide a punch and die alignment system. The system includes a first die including a first die aperture for receiving at least a portion of a punch. The system also includes a second die including a second die aperture for receiving at least a portion of the punch. A first housing includes a first die passage for receiving at least a portion of the first die. A second housing includes a second die passage for receiving at least a portion of the second die and at least a portion of the first die. The second die passage permits at least a portion of the first die to rotate therein. Thereby permitting the first die aperture and the second die aperture to be aligned with each other.

Other aspects of the present invention provide a method of aligning dies of a punch and die assembly. The method includes inserting at least a portion of a punch into a punch receiving passage or first die aperture in a first die. The punch receiving passage of the first die is aligned with a punch receiving passage of a second die by rotating the first die with respect to the second die and attempting to advance the punch into the punch receiving passage in the second die to determine a location of the first die relative to the second die where the punch will experience a least amount of frictional forces from walls of the punch receiving aperture of the first die and the punch receiving aperture of the second die when being advanced through the punch receiving aperture of the first die and the punch receiving aperture of the second die.

Additional aspects of the present invention provide a punch and die assembly. The punch and die assembly includes a first die including a first die aperture for receiving at least a portion of a punch. The second die includes a second die aperture for receiving at least a portion of the punch. A first housing includes a first die passage for receiving at least a portion of the first die. A second housing includes a second die passage for receiving at least a portion of the second die and at least a portion of the first die. The second die passage permits at least the first die to rotate therein, thereby permitting the first die aperture and second die aperture to be aligned with each other. The punch and die assembly also includes a punch assembly including a punch, at least a portion of which extends through the first die aperture and second die aperture during a punching operation.

Still other objects and advantages of the present invention will become readily apparent by those skilled in the art from the following detailed description, wherein it is shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

As discussed above, the present invention relates to mechanically punching holes in substrates. The present invention is particularly useful for insuring that punches and dies are precisely aligned. Helping to insure that punches and dies are aligned as good as possible helps to ensure a better fit in die bar assemblies. The present invention may also result in higher hole quality and longer punch and die life.

Figure 1:
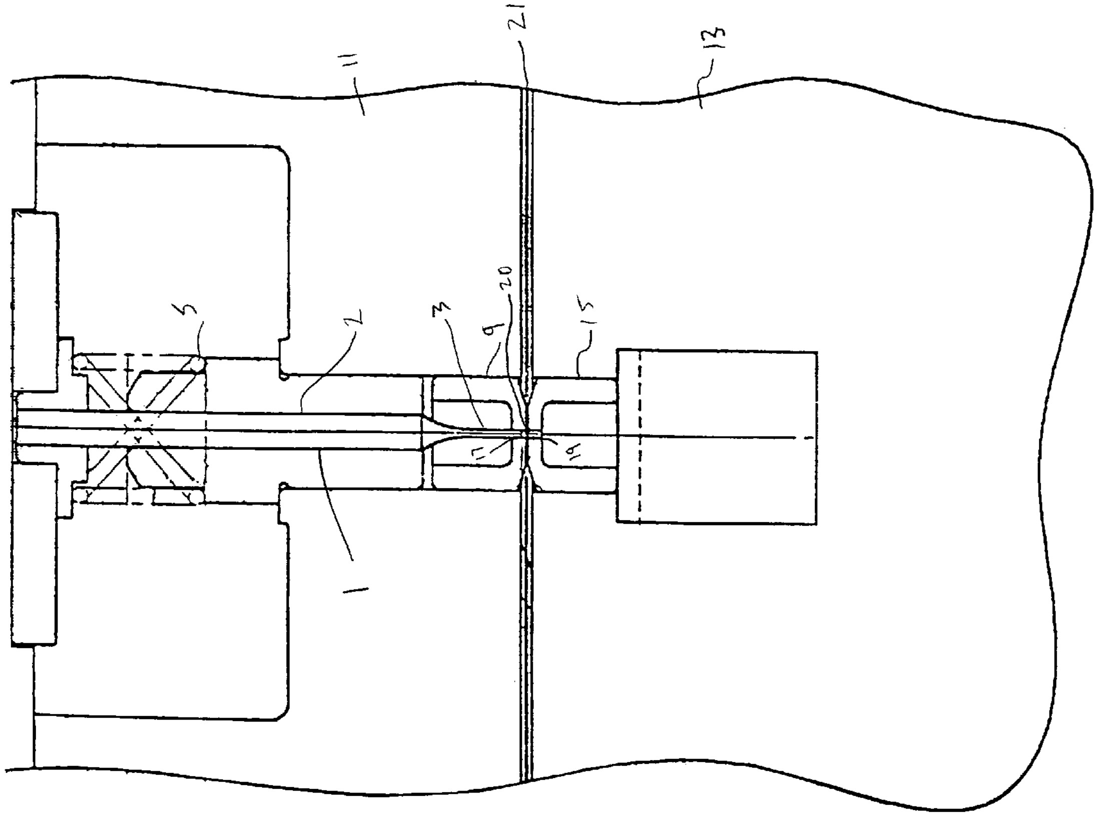
Fig. 1 Prior Art
FIG. 1 represents a cross-sectional view of an embodiment of a known single punch and die assembly.

FIG. 1 illustrates an embodiment of a known single punch and die assembly. The device illustrated in FIG. 1 includes a punch 1. The punch includes a punch stem 2 and a punch tip 3. The punch 1 may be biased in a retracted position by compression spring 5. All of the elements of the punch, including actuation-means, may be referred to as a punch assembly 7.

Punch tip 3 extends into an upper die 9, sometimes called a material stripping die or stripper. Upper die 9 includes a punch receiving passage 17. The upper die 9, the punch 1, compression spring 5, and other portions of the punch assembly are typically housed within upper housing 11.

The punch and die assembly shown in FIG. 1 also includes a lower housing 13. A lower die 15, sometimes called a cutting die, is housed within housing 13. The lower or cutting die 15 typically includes a cutting surface 20 about the upper opening of the punch receiving passage 19. Lower die 15 includes a punch receiving passage 19.

For a punching operation, the upper housing 11 and lower housing 13 are placed in close proximity to each other. A substrate 21 in which holes to be formed is arranged between the upper housing 11 and the upper die 9 and the lower housing 13 and lower die 15.

Figure 2:
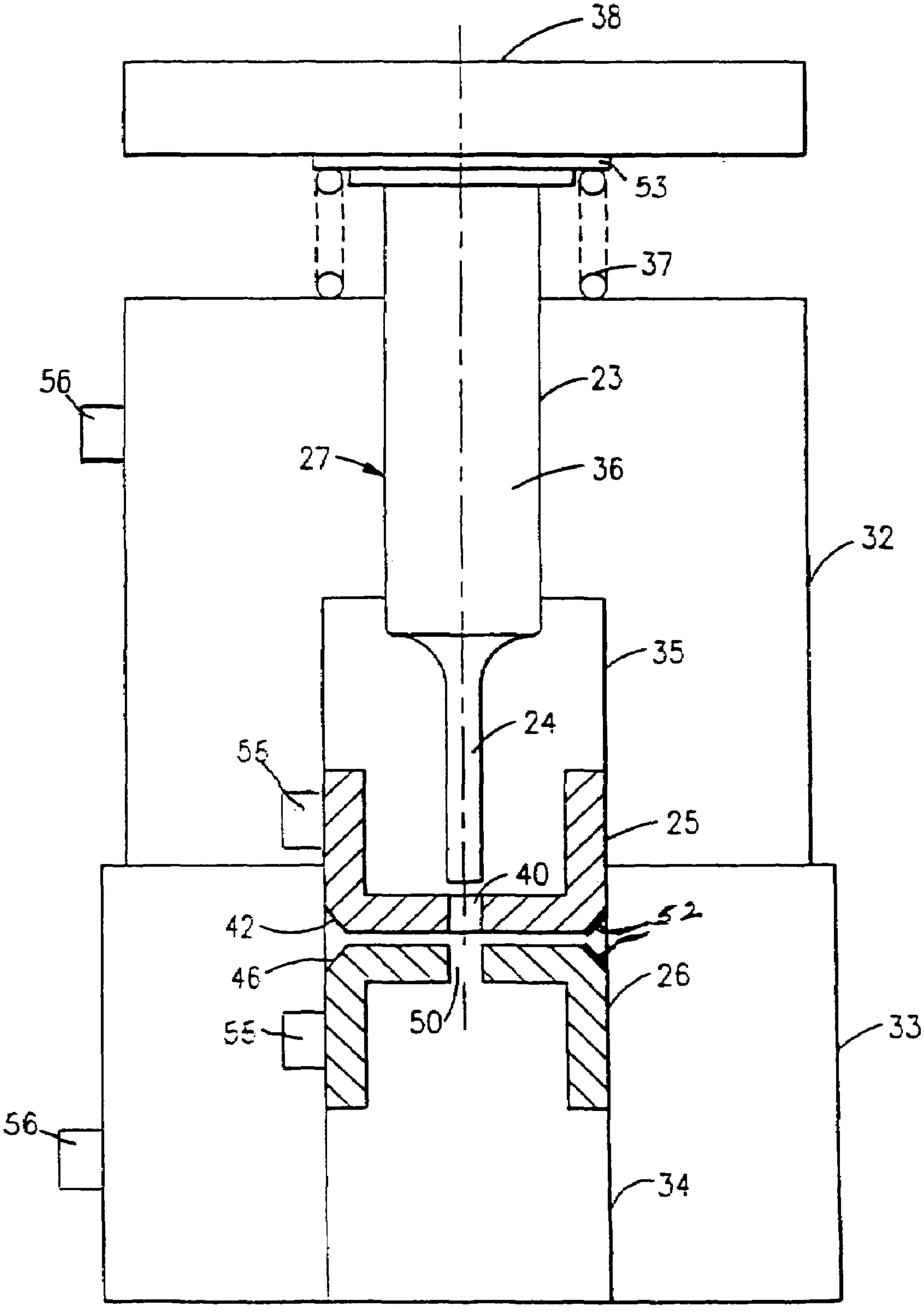
FIG. 2 represents a cross-sectional view of an embodiment of a punch and die assembly according to the present invention.

When forming a hole in the substrate 21, the punch tip 3 passes through punch receiving passage 17 in the upper die 9, through substrate 21 and into punch receiving passage 19 in the lower die 15. Typically, punches such as that shown in FIGS. 1 and 2 are actuated by a driving coil assembly. The punches are directly propelled by electromagnetic repulsion forces generated between the coil and the copper disc at the rear of the punch. Leads leading away from the coil connect the coil to a driver circuit.

To actuate the punch, the driver circuit sends a current pulse down the leads to the coil. The current pulse in the coil generates a rapidly changing magnetic field. This field in turn generates intense eddy currents in the copper disc. The coil magnetic field interacting with the secondary magnetic field generated by the eddy currents repels the punch, propelling it toward the dies and the substrate in which holes are to be formed.

Preferably, the punch is propelled with an extremely high accelerating force. According to one embodiment, the accelerating force on the punch is approximately 20 lbs. However, the force of the punch may be varied, depending, among other factors, upon the substrate being punched, for example.

As stated above, and as illustrated in FIGS. 1 and 2, the punch assembly may also include a spring for biasing the punch in an unextended direction, in other words, in a retracted position. The spring returns the punch to its starting position after actuation. The force that the spring applies to the punch may be varied, depending upon the application.

During actuation, the driving coil will be energized, producing a magnetic field that repels the punch. The magnetic field causes the punch to travel through the dies. After exiting the upper die, the punch then engages the substrate to form a hole.

After engaging the substrate, the punch applies pressure to the upper surface of the substrate. The pressure applied to the substrate forces it onto the lower die. The cutting surface of the lower die will cut the substrate as the pressure from the punch in the opening of the lower die increases. When the substrate is finally cut and a hole formed therein, the punch will pass into the punch receiving aperture of the lower die. Upon reaching its maximum extension, the punch will then be drawn back to its starting position by the return spring and the rebound momentum derived from the bounce of the punch off of the top of the punch guide.

Often, punches and dies have extremely small clearances and tolerances. Additionally, some of these tolerances may be too small to be accurately measured utilizing currently known technology. For example, according to some applications, the clearance (between punch tip 3 and punch receiving opening 17 in the upper die 9 must be fitted to a clearance of about 0 to about 10 millionths of an inch. The lower die may also have a similar clearance with respect to the punch tip.

A clearance of about 10 millionths of an inch makes it necessary for the punch tip and punch receiving passages to have a concentricity of about 5 millionths of an inch or less relative to the outside diameter of the punch tip. If this clearance is not achieved, edges of the punch may interfere with the cutting dies. Initially, interaction between the punch and dies may result in undesirable forces on the punch and/or dies. Interaction between the punch tip and the cutting dies may cause chipping of the punch and/or dies. In some instances, portions of the substrate could be pinched between the punch and die resulting in damage, such as deformation or material removal, from the substrate being punched. Substrate material may also be more likely to interfere with movement of the punch and clog the punch receiving opening in the dies.

The present invention provides an apparatus and method for aligning dies and a punch that passes through the dies to form holes in a substrate arranged between the dies. FIG. 2 illustrates an example of an embodiment of a punch assembly according to the present invention. The embodiment illustrated in FIG. 2 includes punch 27. Punch 27 includes punch stem 36 and punch tip 24. Compression spring 37 biases the punch 27 in a retracted position. As illustrated spring 37 engages extension 53 of punch 27 and housing 32. The elements including the punch, the compression spring, and other components added to the punch may be referred to and assembled into punch assembly 38.

The punch/punch assembly may be at least partially housed within an upper housing 32. Upper housing 32 may include a passage 23 for receiving the punch stem 36. The upper housing 32 may also include a die receiving passage 35. Die receiving passage 35 receives at least a portion of upper die 25. Typically, to permit upper die 25 or a member attached upper die 25 to rotate, the die receiving passage 35 typically has a cylindrical cross-section in a horizontal plane perpendicular to the plane of the cross-section illustrated in FIG. 2.

It follows that upper die 25 may also have a cylindrical cross-section in a horizontal plane perpendicular to the cross sectional plane illustrated in FIG. 2. Alternatively, upper die 25 could be interconnected with a member having a cylindrical cross-section. The cylindrical cross-section of upper die 25 or an attached member permits upper die 25 to rotate within die receiving passage 34 in lower housing 33.

Upper die 25 may have a U-shaped cross-section when viewed in the plane illustrated in FIG. 2. However, the upper die may have other cross-sectional shapes. For example, the entire die could be solid rather than having a U-shape. Nonetheless, the shape of the upper die illustrated in FIG. 2 may maximize the stability of upper die 25 within the die receiving passage 35 while minimizing the distance over which the punch tip must pass through a die receiving aperture in the die on receiving the punch.

Upper die 25 includes a punch receiving aperture 40 for receiving at least a portion of the punch tip 24. The edge 42 of upper die 25 may be beveled as illustrated in FIG. 2 to facilitate insertion of upper die 25 in a die receiving passage 35.

The present invention may also include a lower housing 33. Lower housing 33 includes the die receiving passage 34 for receiving lower die 26. As with upper die receiving passage 35, die receiving passage 34 in the lower housing 33 typically has a cylindrical cross-section in a horizontal plane perpendicular to the cross-sectional plane illustrated in FIG. 2. Alternatively, the lower die may be interconnected with another member having a cylindrical cross-section. The cylindrical cross-sectional shape of die receiving passage 34 may facilitate rotation of upper die 25 and/or lower die 26 if arranged within die receiving passage 34.

As illustrated in FIG. 2, the die passages 35 and 34 are smooth bore passages. As a result rotation of the dies 25,26 would not necessarily result in any vertical movement of the dies in their die passages.

The present invention includes lower die 26. The lower die may have a substantially similar shape as the upper die. Therefore, the above discussion regarding the shape and configuration of the upper die is referred to and applies here with respect to the lower die as well. For example, the lower die may have a substantially inverted U-shape, as illustrated in FIG. 2. The edge 46 of the lower die may also be beveled. One difference between the upper die and the lower die is that lower die 26 may include a cutting surface around the perimeter of the punch receiving passage. The cutting surface helps to facilitate the formation of holes in a substrate arranged between upper die and lower die.

By permitting rotation of at least one of the upper die and the lower die relative to the other, the present invention may permit the upper die aperture and the lower die aperture to be arranged relative to each other as optimally close as concentricity permitted by the dies and the upper housing and the lower housing. The present invention may permit the upper die aperture and the lower die aperture to be aligned so as to be concentric with in about 5 millionths of an inch. However, any necessary alignment may be created with the present invention. According to a typical embodiment, the best possible or optimal alignment is created with the present invention.

Once aligned, an alignment mark 52 may be created or applied or otherwise provided on the first die and on the second die. The alignment of a particular upper die and lower die may be recreated in a particular upper housing and lower housing by simply realigning the alignment marks on the upper die and lower die. The present invention permits pairs of matched dies to be properly aligned when mounted in a die bar assembly. The present invention may permit a delicate and precise alignment that may not be achievable with known measurement and/or alignment methods and/or apparatuses.

When aligning dies according to the present invention, a first die and/or a second die may be selected and matched to die receiving passages in an upper and lower housing, respectively. According to one embodiment, the dies may be matched to die receiving passages in upper and lower housings so as to have a space between the outer surface of the die and the inner surface of the die receiving passage between about 0 and about 10 millionths of an inch. Then, at least a portion of the upper die or the lower die may be inserted into their respective opening in either the upper housing or the lower housing. According to one embodiment, rather than being aligned in an upper housing and a lower housing, the dies may be aligned in an alignment apparatus that includes two members similar to the upper housing and the lower housing. Alternatively, the upper housing and the lower housing may be arranged together as they would be in a complete punch assembly for alignment. The alignment may then be carried and then the dies and housings transferred to the punch assembly.

To align the dies of a punch and die assembly, at least a portion of the punch, such as at least a portion of the punch tip, may be inserted into the punch receiving aperture in one of the dies. The dies may then be arranged with respect to each other as they would be arranged in the working punch and die assembly. For example, prior to alignment, the entire punch assembly and the housings may be assembled. Also prior to alignment, the upper die may be inserted into the die receiving passage in the lower housing and/or the lower die may be inserted in the die receiving passage of the upper housing to ensure proper fit of the dies in those passages as well.

Next, the dies may be arranged relative to each other by rotating at least one of the dies with respect to the other while attempting to advance the punch into the punch receiving passage in the second die to determine a location of a first die relative to the second die where the punch will experience the least amount of frictional or interference forces from walls of the punch receiving apertures of the first die and the second die. The alignment of the dies may be such that the punch may actually hit an area of the one of the dies in the vicinity of the opening of the punch receiving passages and be entirely prevented from advancing through the punch receiving passages or apertures. Once the desired arrangement of the two dies with respect to each other is determined, the relative positions of the first die and second die may recorded by providing at least one mark on the first die and the second die.

Prior to alignment, at least a portion of the lower die may be inserted into the die receiving passage 34 in lower housing 33. Similarly, at least a portion of the upper die may be inserted into the die receiving passage 35 in the upper housing 32. In the embodiment illustrated in FIG. 2, the lower die may be entirely inserted into the lower die receiving passage 34 in the lower housing 33. In this embodiment, the upper die 25 may be only partially inserted into the die receiving passage 35 in the upper housing 32. The remaining portion of the upper die 25 may be inserted into the die receiving passage 34 in the lower housing. In this embodiment, the upper housing and/or the lower housing and/or upper die and/or lower die may be free for rotation relative to each another.

After preliminarily arranging the upper die, lower die, upper housing and/or lower housing, the punch may be at least partially inserted into the punch receiving aperture 40 in the upper die 25. The upper die may need to be rotated to ensure free passage of the punch into the punch receiving aperture 40. Then, the upper die 25, lower die 26, upper housing, and/or lower housing may be rotated while the punch is attempted to be depressed repeatedly until the most concentric alignment between the punch receiving aperture 40 and punch receiving aperture 50 is achieved. In the process according to the present invention, the punch may first be at least partially inserted into what is referred to herein as the lower die. In such an embodiment, the above process may still be followed, but references to upper and lower reversed.

After alignment, the position of the upper die and the lower die with respect to each other are then marked on the upper and lower dies. The marking could include any suitable marking. For example, the marking could include a mark formed with a writing instrument. Other markings could include something adhesively adhered to the upper die and the lower die. Other satisfactory marking methods may also or alternatively be employed.

The present invention may include a sensor (not shown) for sensing frictional resistance between the punch and the punch receiving apertures in the upper and lower die during the alignment process. Such an embodiment may include some means of display (not shown) for indicating the interference forces or frictional forces.

As indicated in the prior description and drawings, the invention may be practiced for providing the best possible or optimum match and alignment of the upper and lower apertures from a selection of dies. This is done in view of the realization that in manufacturing processes where there are tolerances, precise alignment would not likely result. In the selection and aligning procedure of the invention an upper die 25, for example, located in the upper die receiving passage 35 of upper housing 32 might extend partially into lower die receiving passage 34 in lower housing 33. Punch tip 24 would be inserted through upper die aperture 40 and advance into the lower die receiving passage or aperture 50. During this process one or both dies would be rotated to select the optimum alignment for permitting punch tip 24 to pass through the dies with the least amount of frictional or interference forces from the walls of the punch receiving apertures 40,50. When this optimum alignment is achieved the relative position of dies 25,26 is recorded by providing at least one mark on first die 25 and on second die 26. This enables the optimal positioning to be recreated. The punch and both dies would be mounted in the punch and die assembly and assume the normal operating position as in a known assembly which would be similar to what is illustrated in FIG. 1. Because of the tight clearance or snug fitting of each die in its passage (e.g., about 0 to about 10 millionths of an inch) each die remains in whatever position to which it had been rotated. In that regard, because of the tight clearance or snug fitting, relative rotation of one die with respect to the other could also be achieved by rotating a die housing 32 or 33 rather than the die and each die would, of course, maintain its orientation in its passage. Any suitable means may be used for rotating the dies and/or housings since the specific structure for such rotation is not critical to the invention. FIG. 2 schematically illustrates structure 55 for rotating the dies and illustrates structure 56 for rotating the housings.

Utilizing the present invention, about 40 die and punch sets have been matched for rotation alignment. About 70 percent of the matched die and punch sets have a significantly better fit as compared to alignment without utilizing the present invention. Of the 40, about 25 percent seemed to fit well in any rotational condition and about 5 percent did not fit well regardless of rotation or alignment. Thus, about 5 percent could be eliminated from final assemblies. Clearly, the present invention significantly improves the alignment condition of punches and dies as showing a better fitting die bar assembly in resulting in higher punch and die life.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

I claim:

1. A punch and die assembly, comprising:

a first die including a first die aperture for receiving a punch; a second die including a second die aperture for receiving the punch; a first housing including a smooth bore first die receiving passage receiving at least a portion of the first die; a second housing including a smooth second die passage receiving at least a portion of the second die and being configured to receive at least a portion of the first die, the second die receiving passage being configured to permit at least one of the first die and the second die to rotate therein, thereby permitting the first die aperture and the second die aperture to be optimally aligned with respect to each other and with respect to the punch whereby the punch may freely pass through the first die aperture and the second die aperture with minimal friction from the walls of the first die aperture and of the second die aperture; and a punch assembly including a punch, wherein the punch extends through the first die aperture and the second die aperture during a punching operation.

2. The punch and die assembly according to claim 1, wherein the second die passage receives all of the second die and being configured to receive at least a portion of the first die.

3. The punch and die assembly according to claim 1, wherein the first die receiving passage and the second die passage are configured to permit at least the first die to rotate therein.

4. The punch and die assembly according to claim 1, further comprising: a first alignment mark on the first die; and a second alignment mark on the second die; wherein alignment of the first alignment mark and the second alignment mark aligns the first die aperture and the second die aperture.

5. The punch and die assembly according to claim 1, wherein the first die aperture and the second die aperture are alignable within about 5 millionths of an inch.

6. The punch and die assembly according to claim 1, further comprising: a compression spring engaging the punch for biasing the punch to a retracted position.

7. The punch and die assembly of claim 1, wherein said first and second housings are rotatable relative to each other.

8. The punch and die assembly of claim 1 wherein at least one of said first die passage and said second die passage is configured to snugly receive at least a portion of each of said first die and said second die and to permit at least one of said first die and said second die to rotate therein.

9. The punch and die assembly of claim 1, wherein the space between the outer surface of each of said dies and the inner surface of its die passage is between about 0 and 10 millionths of an inch.

10. A punch and die alignment system, comprising: a first die including a first die aperture for receiving a punch; a second die including a second die aperture for receiving the punch; a first housing including a smooth bore first die passage receiving at least a portion of the first die; and a second housing including a smooth bore second die passage receiving at least a portion of at least one of the first die and the second die, the second die passage being configured to permit at least one of the first die and the second die to rotate therein, thereby permitting the first die aperture and the second die aperture to be optimally aligned with respect to each other and with respect to the punch whereby the punch may freely pass through the first die aperture and the second die aperture with minimal friction from the walls of the first die aperture and of the second die aperture.

11. The punch and die alignment system according to claim 10, wherein the second die passage receives at least a portion of the second die and at least a portion of the first die.

12. The punch and die alignment system according to claim 10, wherein the first die passage and the second die passage are configured to permit at least the first die to rotate therein.

13. The punch and die alignment system according to claim 10, further comprising: a first alignment mark on the first die; and a second alignment mark on the second die; wherein alignment of the first alignment mark and the second alignment mark aligns the first die aperture and the second die aperture.

14. The punch and die alignment system according to claim 10, wherein the first die aperture and the second die aperture are alignable within about 5 millionths of an inch.

15. The punch and die alignment system of claim 10, wherein said first and second housings are rotatable relative to each other.

16. The punch and die assembly of claim 10 wherein at least one of said first die passage and said second die passage is configured to snugly receive at least a portion of each of said first die and said second die and to permit at least one of said first die and said second die to rotate therein.

17. The punch and die assembly of claim 10, wherein the space between the outer surface of each of said dies and the inner surface of its die passage is between about 0 and 10 millionths of an inch.

* * * * *